Oct. 29, 1929.  R. C. PENFIELD ET AL  1,733,237
PUSHING AND UP-EDGING APPARATUS
Filed Aug. 16, 1927  5 Sheets-Sheet 3

Inventors
Raymond C. Penfield
Claud E. Fuller
By James R. Hodder
Attorney

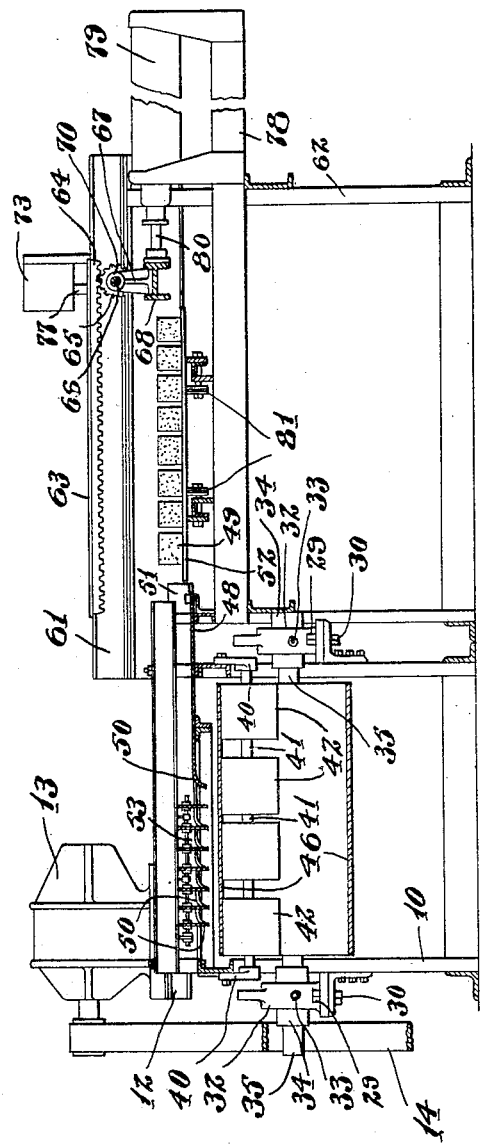

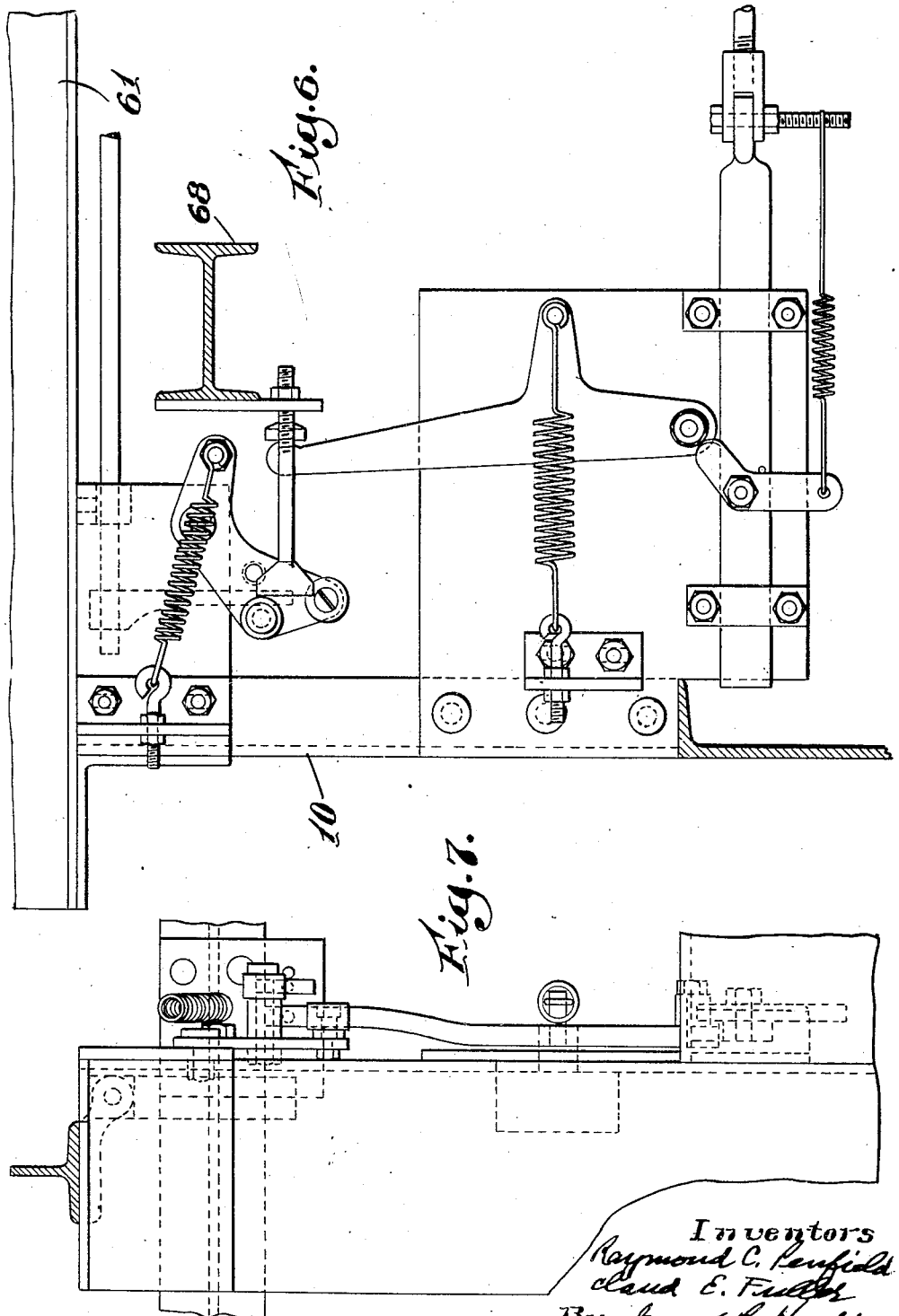

Patented Oct. 29, 1929

1,733,237

UNITED STATES PATENT OFFICE

RAYMOND C. PENFIELD AND CLAUD E. FULLER, OF NEW YORK, N. Y., ASSIGNORS, BY DIRECT AND MESNE ASSIGNMENTS, TO AMERICAN EQUIPMENT COMPANY, OF CHICAGO, ILLINOIS, A CORPORATION OF OHIO

PUSHING AND UP-EDGING APPARATUS

Application filed August 16, 1927, Serial No. 213,302.

Our present invention relates to brick making machinery, and more particularly to an improved apparatus forming part of a machine for hacking bricks as they come from the drying chambers into units of suitable size to be automatically and mechanically stacked in a kiln preparatory to performing the burning operation thereon.

The apparatus forming the subject matter of the present invention is designed to take the brick from loaded pallets after the same are positioned on a gravity conveyor and place them in position to be further conveyed onto a positioning device in the movement of the bricks toward the point where they are finally hacked. In moving the brick from the gravity conveyor to the positioning point, it is essential that certain operations be performed thereon, such as properly grouping, alining and separating the bricks from the various pallets as the same are positioned in succession, and also turning such bricks through an angle of 90 degrees in order to place such bricks in the best position for hacking and subsequent building of the unit stack into a kiln. It is essential, therefore, that sometime during the progress of the brick from the gravity conveyor to the positioning point, each brick shall be up-edged from its original position of lying flatwise on the pallet.

In practicing our present improved invention, we have devised reciprocating means for pushing the bricks from a plurality of parallelly arranged pallets simultaneously and have arranged the control mechanism for such reciprocating means to be operated at a point predetermined by the position of the first pallet of the succession of pallets in its passage over the gravity conveyor.

In the building of a unit stack of brick that is most convenient in size for subsequent mechanical handling, it is essential that the lower courses thereof have a lesser number of rows of brick than the subsequent layers. The reciprocating device above referred to is designed to sweep off from a plurality of parallelly arranged pallets all the bricks that may be positioned thereon. The number of pallets from which the brick are swept off simultaneously determines the number of rows of brick in one-half the width of a unit stack and, therefore, it will be understood that two groups of loaded pallets must be utilized to provide the requisite member of layers of brick for a layer in the unit stack. The lower courses or layers of brick in the unit stack of bricks are designated as finger courses, the rows of bricks in each course or layer being separated from the other to allow passage therebetween of the lifting fingers of a mechanical lifting fork or device and we have, in our present improved invention, devised means associated with the pushing device whereby such pushing device, in its reciprocating movement will be arranged to push a less number of layers of brick from a plurality of parallelly arranged pallets than the number within the capacity of the pusher and such means is under the control of the operator of the machine, being operable at will.

The pusher is automatically operated by means under the control of the oncoming stream of loaded pallets and such means is operable to reverse the movement of the pusher by means engaged by the pusher at the outward limit of its travel.

Other features and novel constructions of our improved apparatus will appear as the description of the invention progresses.

In the accompanying drawings illustrating a preferred embodiment of our invention, Fig. 1 represents the apparatus in side elevation;

Fig. 5 is a section on the line 5—5 of Fig. 1;

Fig. 6 is a detail layout of the valve operating mechanism for the pusher, and

Fig. 7 is an end elevation of Fig. 6.

Figure 1:
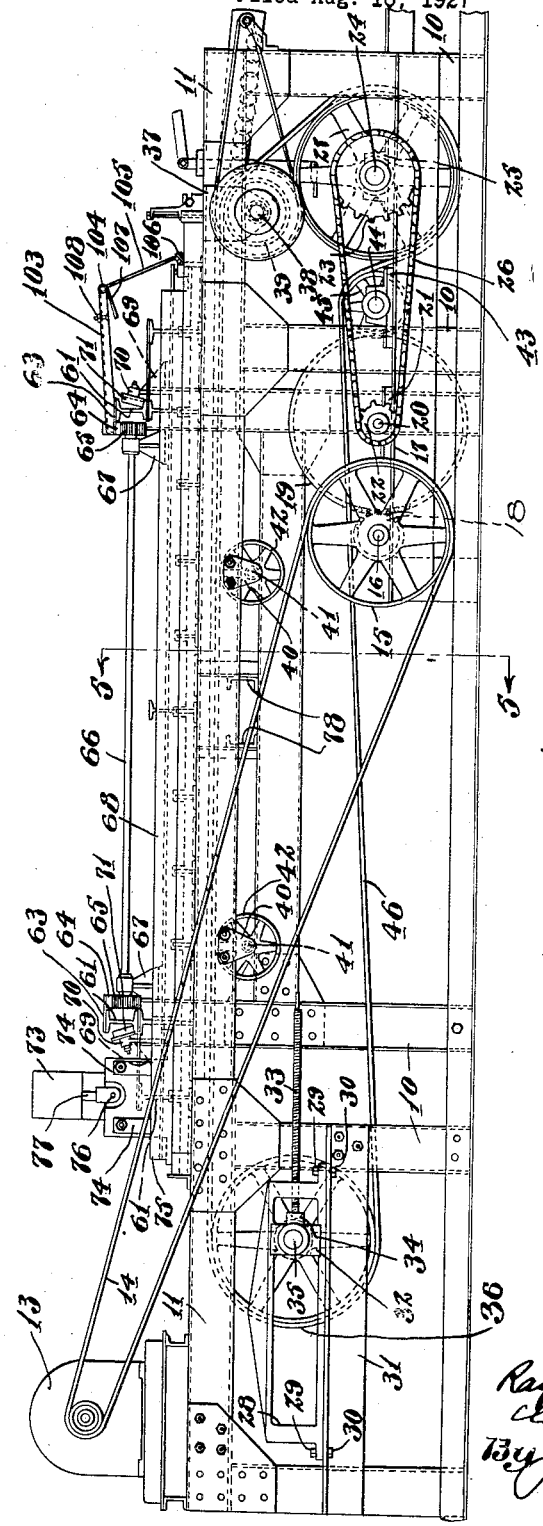

Referring to the drawings, 10 designates a plurality of uprights spaced apart from each other and defining in plan view a rectangular space, while at the top of these uprights 10 are secured longitudinally extending members 11 tied together at their ends and intermediate the ends wherever necessary by cross members 12, this structure defining a substantial elongated rectangular table. Mounted at one end of the frame including the longitudinally extending members 11 is a driving motor 13 which drives, by means of a belt 14 passing over a pulley 15, a shaft 16 that is rotatably mounted in suitable bearings on a sub frame 17 secured to the uprights 10 at the end of the rectangular framework remote from the motor 13. Secured to the shaft 16 at the end thereof remote from the pulley 15 is a pinion 18 which meshes with and drives a gear wheel 19 secured to a shaft 20 mounted in bearings 21 on the sub frame 17. Secured to the shaft 20 on the end remote from the gear wheel 19 is a sprocket 22 in alinement with a sprocket wheel 23 secured to one end of a shaft 24 rotatably mounted in pillow blocks 25 secured to the sub frame 17. Over the sprocket wheels 22 and 23 runs an endless sprocket chain 26 which transmits power from the shaft 20 to the shaft 24. Mounted on, and secured to, the shaft 24 and of a width substantially equal to the width of the rectangular frame above referred to is a pulley 27. At the end of the rectangular framework above referred to, and on each side thereof and adjacent the motor 13, is a guideway 28 secured by bolts and nuts 29 and 30 respectively to longitudinally extending members 31 that are secured to the uprights 10, the guideways 28 being located in alinement with, but below, the longitudinally extending members 11. In each of the guideways 28 is slidably mounted a bearing 32, motion of the bearing members 32 longitudinally of the guideway 28 being accomplished by the adjusting screw 33 engaging with a boss 34 on the bearing member 32 and threaded through one end of the guideway 28. Rotatably mounted in the bearing members 32 and in substantial parallelism with the shaft 24 is a shaft 35 on which is secured a pulley 36 of a width substantially equal to the width of the pulley 27. A horizontal plane passing through the upper point of the pulley 36 will lie slightly below the horizontal plane in which lies the upper surface of the longitudinally extending members 11. Secured to the longitudinally extending members 11 near the end thereof remote from the motor 13 and extending downwardly therefrom are bearing brackets 37 one on each side of the rectangular frame including the longitudinally extending members 11 and at the lower end of such members 37 are formed bearings in which is rotatably mounted a shaft 38, which shaft lies parallel to the shafts 24 and 35. Secured to, and rotatable with, the shaft 38 is a pulley 39, the top edge of which lies in substantially the same horizontal plane as lies the pulley 36 and such pulley 39 is of substantially the same width as such pulley 36. Spaced along the longitudinally extending members 11 and secured thereto are downwardly extending brackets 40 in the lower end of which brackets are rotatably mounted the shafts 41 on each of which shafts is secured a plurality of pulleys 42, the total width of the plurality of pulleys 42 on each of the shafts 41 being substantially equal to the width of the pulleys 36 and 39 and the upper edge of the pulleys 42 lies in the same horizontal plane as lies the upper edges of the pulleys 36 and 39 respectively. Secured to the members 17 on each side of the frame or standard above described, and in alinement with each other, are pillow blocks 43 in which pillow blocks is rotatably mounted a shaft 44 that extends parallel to the shaft 24 and on the shaft 44 is secured an idler pulley 45 of substantially the same width as the pulley 27. Over the pulleys 36, 39 and 27 runs a wide conveyor belt 46, the upper reach of said conveyor belt 46 lying in a horizontal plane and supported in said plane by the idler pulleys 42, the idler pulley 45 acting as a means to elevate the lower reach of such conveyor belt 46 sufficient to clear certain mechanism located on the framework. The tension of the conveyor belt 46 is adjusted by means of the adjusting screw 33, moving the bearing blocks 25 longitudinally of the slide 28, as above described. Power is transmitted to the conveyor belt 46 from the motor 13 through the belt 14, gear wheels 17 and 19, and sprocket chain 26 in the manner above described.

Figure 2:
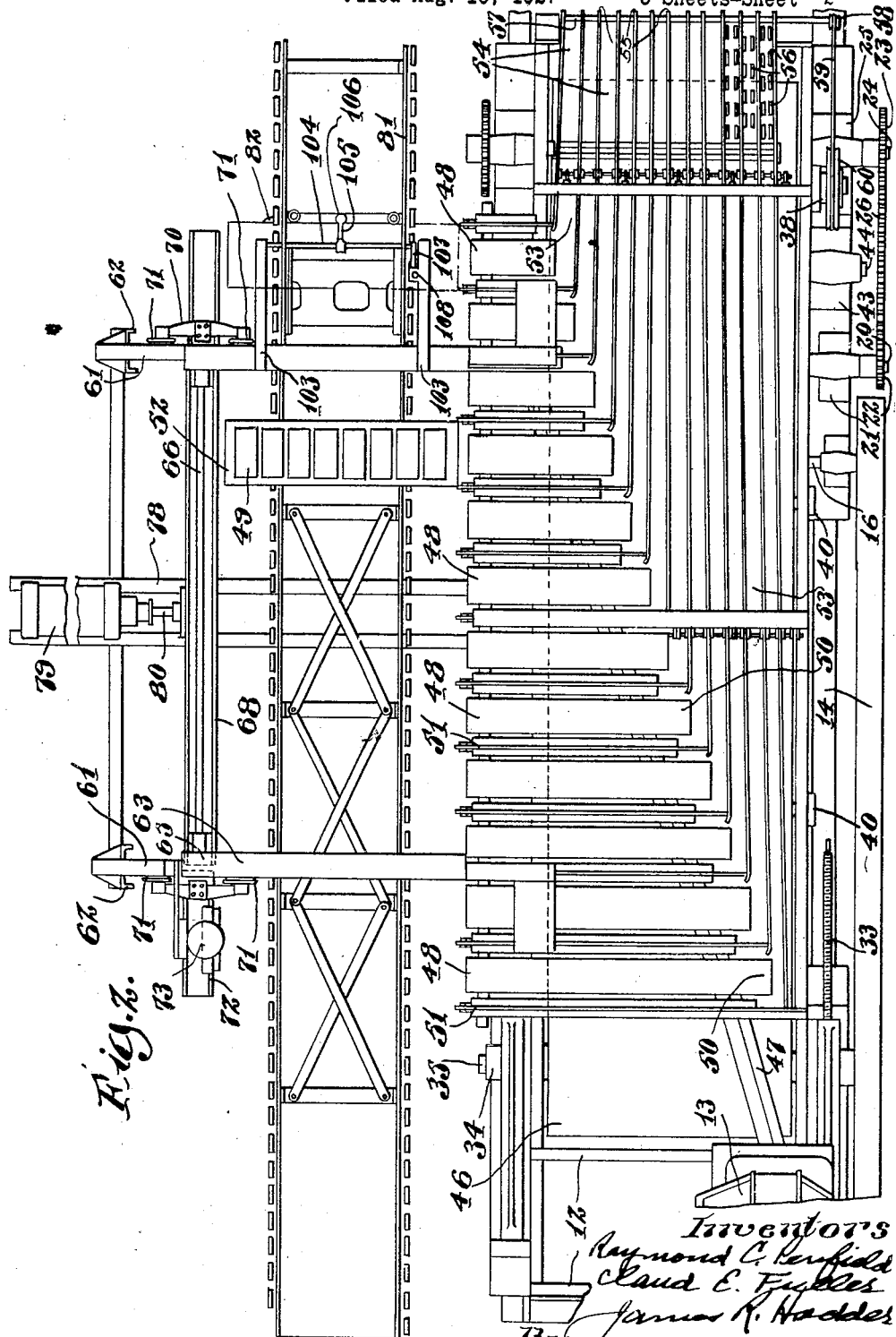
Fig. 2 is a plan view.

Secured to the framework above described, and extending diagonally with respect thereto and above the conveyer belt 46 is a supporting member 47. Secured to one of the longitudinally extending members 11; that is, the upper one, as viewed in Fig. 3 and the inner ones when considered with respect to Figs. 1 and 2, are slideways 48 arranged parallel with, and spaced apart from, each other a distance slightly greater than the length of a brick 49, said slideways being of different lengths, the left hand slideway 48, as viewed in Fig. 2, being longest and the said slideways decreasing in length as the right hand end of the mechanism is approached. Each of the slideways 48, on its other end, is secured to the supporting member 47 and the extreme ends of such slideways are curved downwardly at 50 toward the conveyor belt 46. Between each guideway 48 and also exterior of the end of the guideways are partition plates 51 which are utilized to guide the bricks 49 as the same are pushed from the slideways. Preferably the shortest guideway 48; that is, the guideway at the right hand end of Fig. 2 is of sufficient length to hold three or four of the bricks 49, each of the succeeding guideways to the left being capable of holding one more in succession, while, as will be noted in Fig. 2, the pallet 52 is capable of being loaded with a maximum of eight bricks 49 arranged parallel to each other and flatwise on such pallet 52. Each of the slideways 48 at the downwardly extending rounded end 50 terminates in a guideway 53, there being one guideway for each of the slideways 48, and such guideways 53 are arranged parallel to each other and converge slightly from the entrance end thereof at the left of such guideways to the exit end adjacent the right hand end of Fig. 2, their function being to guide the bricks as the same are moved along the guideways by resting on the conveyor belt 46.

At the delivery end of the guideways 53 are a plurality of parallelly arranged downwardly extending guideways 54 defined by a plurality of parallelly arranged strips or sheets 55 of metal or other suitable material, and in the bottom of the troughs or guideways 54 and rotatably mounted on suitable shafts secured to the plates or strips 55 is a plurality of anti-friction rollers 56 which assist the onward and downward movement of the bricks as they are moved from the guideways 53 into the alined guideways 54 and at the extreme right hand end thereof is rotatably mounted a shaft 57 provided at one end with a pulley 58 over which passes a driving belt 59 leading to and driven by the pulley 60 secured to the shaft 38, the surface speed of the shaft 57 being greater than the speed of travel of the bricks 49 as they pass down the guideways 54, this construction assuring a quick "snapping off" action of the bricks from the troughs or guideways 54 onto a receiving table (not shown).

Secured to the uprights 10 at one side of the rectangular framework, that is, at the entrance end of the guideways 48, and extending from the uprights are I beams 61, these I beams being spaced apart from each other and arranged symmetrically with respect to the guideways 48, the outer end of such I beams being supported by channel iron uprights 62. To each of the I beams 61 and extending longitudinally of such I beams is secured a plate 63 on the under inner face of each of which plates is formed a rack 64 which mesh with pinions 65 secured to a shaft 66 rotatably mounted in bearing members 67 secured to and spaced apart from each other by a pusher bar 68 which extends transversely of the I beams 61. Secured to the pusher bar 68 adjacent the bearing member 67 and at each end of said pusher bar is a bearing bracket 69, each of which has secured to its upper end a member 70 provided with stub shafts on which are rotatably mounted wheels 71 which engage with one of the webs of the I beams 61 as a track and by means of which the pusher bar 68 is supported. The length of the pusher bar 68 is equal to the width of the guideways 48, less two, and in our improved device, therefore, there would ordinarily be two guideways 48 at the left hand side of the apparatus, as viewed in Fig. 2, onto which the bricks 49 would not be pushed. To obviate this defect and to make it possible to push onto all the guideways a plurality of rows of brick simultaneously from a plurality of parallelly arranged pallets 52, we have arranged at the left hand end of the pusher bar 68, as viewed in Figs. 1 and 2, a support 72 on which is mounted a solenoid 73 and which support has formed thereon a pair of guideways 74. Slidably mounted on the guideways 74 for vertical movement is an auxiliary push bar 75 of a length equal to the width of two of the guideways 48, the upper end of this push bar 75 being pivotally mounted at 76 to the lower end of the plunger armature 77 of the solenoid 73.

Mounted on an auxiliary framework 78 that is arranged between, and extends parallel to, the I beams 61, is an air cylinder 79, the piston rod 80 of which is connected to the rear face of the push bar 68 and arrangements are provided for admitting compressed air or other motive fluid to either side of the piston enclosed within the cylinder 79 and attached to the piston rod 80 for the purpose of giving a reciprocatory motion to the push bar 68, that is, a motion toward and from the guideways 48 and in alinement therewith.

Figure 3:
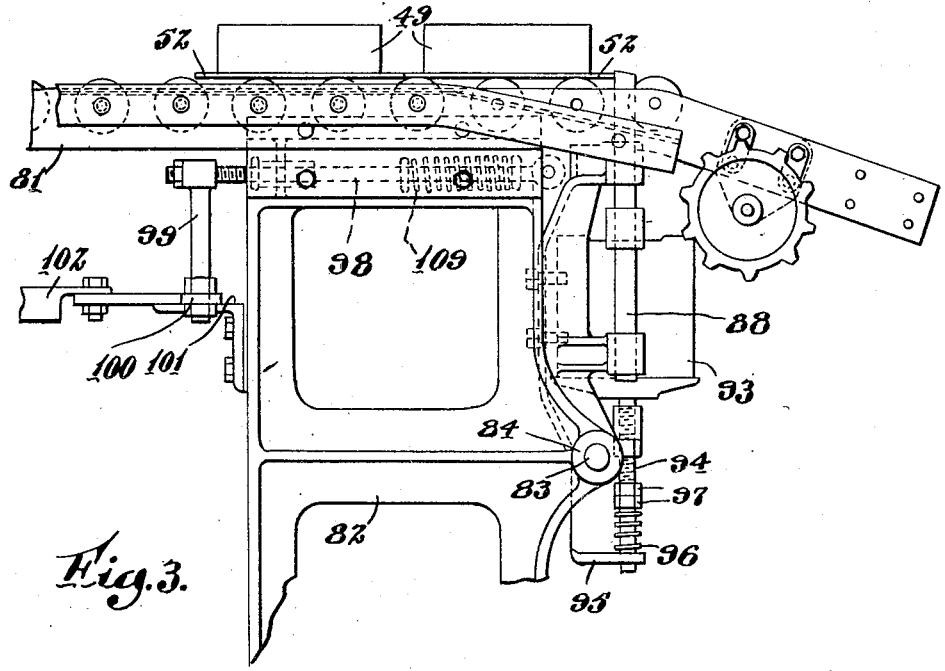
Fig. 3 is a fragmentary side elevation of a portion of the apparatus showing the means for stopping the stream of pallets in position;

Between the entrance end of the guideways 48 and the supporting uprights 62 of the I beams 61, and extending parallel to the rectangular framework above described, is a gravity conveyor indicated by the reference numeral 81. The pallets 52 each containing a plurality of spaced brick 49 thereon are fed by gravity over the conveyor 81, and at a point near the right hand end of such conveyor 81, as viewed in Fig. 3, is arranged a bearing pedestal or framework 82, having at its extreme right hand end, and intermediate the top and bottom surfaces thereof, alined bearings 84 in which is rotatably mounted a shaft 83, longitudinal movement of said shaft with respect to the bearings 83 being prevented by collars 85 secured to the shaft 84 in any suitable manner. Secured to the shaft 84 between the bearings 83 and extending upwardly from said shaft to a point below the level of the conveyor 81 is a frame 86 provided on each side with laterally extending bearing members 87, the members 87 on each side of the frame 86 being provided with bearings in which are slidably mounted bars 88, and secured to said bars 88 at a point intermediate their ends and extending between the bars is a crosshead 89, which crosshead is secured at its middle point by a bolt and nut 90 and 91, respectively, to a plunger armature 92 of a solenoid 93, the upper ends of the bars 88, when the plunger armature 92 is in its uppermost position, lying in the path of movement of the pallets 52, and it will be obvious, therefore, that if a stream of pallets 52 is being moved from the gravity conveyor 81 from left to right, as viewed in Fig. 2, when the first pallet 52 of such stream is brought to rest by engagement with the tops of the bars 88, the pallets constituting the stream of pallets 52 will each be brought successively to rest against the preceding pallet. The plunger armature 92 of the solenoid 93 extends longitudinally through such solenoid and has connected at its lower end a rod 94, the lower free end of which has a bearing in an angular shaped member 95 mounted on the shaft 84, a coil spring 96 encircling the rod 94 and this spring is confined between the angular member 95 and the adjusting check nuts 97 and by means of which the tension of the spring 96 may be varied at will. The function of the spring 96 is to insure a rapid return of the plunger armature 92 and, therefore, a return of the bars 88 to their upper, or normal position, when circuit through the solenoid 93 is broken. Secured to the frame 86 and extending to the left under the conveyor 81 is a rod 98 threaded at its rear end to receive a bolt 99, the lower end of this bolt being secured to one arm of a bell crank lever 100 that is pivotally mounted on an angular member 101 secured to the frame 82 and the other arm of this bell crank lever is pivotally attached to an operating member 102 controlling a valve for admitting air to the air cylinder 79 in such manner as to force the piston rod 80 thereof outward from the cylinder to move the pusher bar 68 transversely of the conveyor 81. Mounted on the plate 63 and extending over, and in alinement with, the conveyor 81 is an arm 103 in the end of which is rotatably mounted a shaft 104, having an arm 105 attached thereto and extending downwardly laterally therefrom and provided with a roller or enlargement 106 that lies in the path of movement of the moving stream of bricks 49. Also attached to the shaft 104 is a downwardly and rearwardly extending arm 107 adapted to engage with an adjustable member 108 mounted on the arm 103, the function of the arm 107 and member 108 being to adjust and limit the downward and rearward swinging movement of the arm 105. Connections (not shown) leading from the shaft 104 to the valve controlling the admission of air to the cylinder 79 co-operates with the rod 102 leading to such valve and these two devices are so proportioned that the first pallet 52 of the series of pallets positioned on the conveyor 81 must come into position in alinement with the extreme right hand guideway 48 before such elements will operate the valve above referred to. The operation of this valve, as stated above, moves the pusher bar 68 transversely of the conveyor 81, pushing all of the bricks 49 on the pallets 52 onto the guideways 48, in this manner forcing the bricks originally in said guideways off the rounded ends 50 thereof and into the substantially parallelly arranged guideways or troughs 53 along which they are forced by the belt 14.

Figure 4:
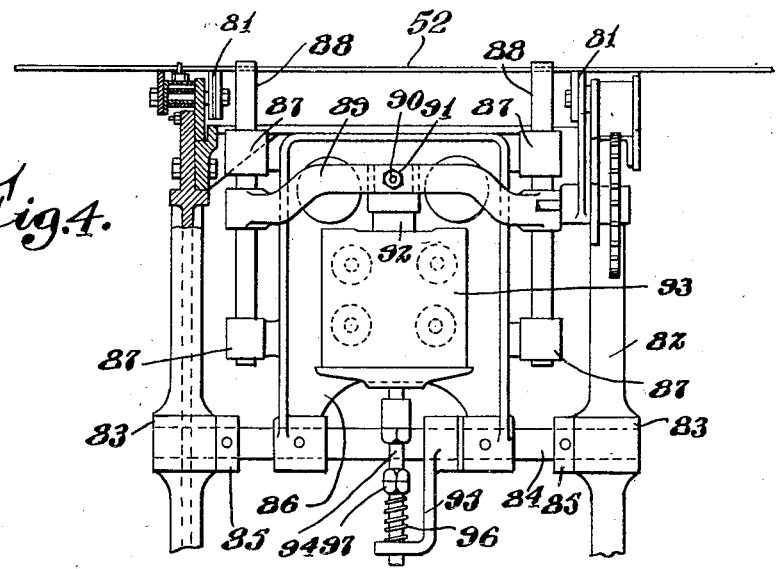
Fig. 4 is an end elevation of Fig. 3.

When the pusher bar 68 reaches the extreme outer limit of its travel, mechanism (not shown) is operated to reverse the air in the cylinder 79, causing thereby a return of the pusher bar 68 to its original, or normal position, as shown in Fig. 2. When such pusher bar 68 reaches its original position, it closes a circuit for the solenoid 93, the plunger 92 of which thereupon moves the upper ends of the bars 88 downward out of the path of movement of the pallets 52 and the frame 86, carrying the solenoid 93, is moved back to its original position, shown in Fig. 4, under the influence of spring 109. The removal of the upper ends of the bars 88 from the pallets allows further loaded pallets to be moved onto the conveyor 81 from the left hand end thereof, as viewed in Fig. 2, and the above sequence of operations is repeated.

The guideways 48 are originally each loaded with as many bricks 49 as the length of such guideways will permit and the travel of the pusher bar 68 is sufficient to insure the positive pushing off from the pallets 52 of all the brick loaded thereon, with a result that, irrespective of the length of the guideways 48, a minimum of eight brick per operation of the pusher bar will be forced out of the exit end of the guideways 48 and such exit ends being rounded, as indicated at 50, each brick will, as it is pushed from the rounded end, be up-edged. The speed of travel of the belt 14, which acts as a conveyor for the various bricks pushed into the substantially parallelly arranged guideways 53, and the speed of travel of the pusher bar 68 are so proportioned with respect to each other, and that the distance between successive bricks moved into any of the guideways 53 will be sufficient to prevent engagement of any brick with its predecessor or successor, and, as a matter of fact, the bricks 49, as they are fed out of the guideways 48, will be moved so rapidly by the conveyor belt 14 that each brick is separated from the other by a minimum distance of two feet.

As referred to above, the present invention is designed to facilitate the assembling of brick into parallelly arranged rows on a receiving table to be afterwards placed on an apparatus such as is described in copending application of Claud E. Fuller, on which apparatus the rows of brick are moved into such position with relation to each other as to form what are known as finger courses in a unit pile of bricks. In this connection it should be noted that the number of parallelly arranged guideways 48 is sufficient to arrange and lead into the parallelly arranged guideways 53 a number of rows of brick sufficient to build one half a course of a unit size of brick that is suitable for subsequent mechanical handling, while the unit courses of brick in such unit size contain four less rows of brick than the regular courses. To adapt the present invention to the building of finger courses of brick, we have arranged the device described above and which consists essentially of a pusher plate or auxiliary pusher plate 75 mounted at the end of the main pusher bar 68 and this plate 75 is mounted for vertical sliding movement, such vertical sliding movement being performed by the solenoid 73 above described and the circuit of which is under the control of an operator located at any convenient point of the machine. If it is assumed that the conveyor 81 is charged or loaded with a plurality of parallelly arranged pallets 52, each containing a plurality of bricks 49, and that the pallets 52 are equal in number to the number of the guideways 48, it is evident that, if the pusher bar 68 be operated, all of the bricks 49 on the pallets in front of the guideways 48 will be pushed off from said pallets and into the guideways 53. To avoid the pushing off of all of the pallets in front of the guideways 48 in the arranging of bricks for the finger courses, the operator, by closing the energizing circuit of the solenoid 73, causes the auxiliary pusher plate 75 to move upward in a vertical direction to a height sufficient to allow the lower edge of said pusher plate to clear the tops of the bricks on the two extreme left hand pallets 52 and the operation of the pusher bar 68 will, under these circumstances, push off from the pallets positioned in alinement with the guideways 48, except the extreme two left hand pallets, all the bricks thereon so that the number of rows of brick passing along the guideways or troughs 53 will be two less than the capacity of the apparatus. This operation may be repeated at will and, as ordinarily two rows of courses constitute a finger course, the above operation will be repeated four times, after which the energizing circuit for the solenoid 73 is broken and the auxiliary pusher plate 75 allowed to function in association with the pusher bar 68.

Having thus described our invention, what we claim as new is:

1. In an improved pushing and up-edging apparatus, the combination of a plurality of parallelly arranged guideways, a pushing device associated therewith and movable toward and from the entrance end thereof, means for positioning a plurality of rows or articles in alinement, one row for each of the parallelly arranged guideways, and electrically operated means associated with the pushing device for increasing the capacity of the pushing device.

2. In an improved pushing and up-edging device, the combination of a plurality of parallelly arranged plates constituting guideways for articles parallelopiped in shape, a trough or guideway for each of said guideways located at the exit end thereof and extending at right angles thereto, a conveyor movable transversely of, and beneath, the guideways and movable beneath, and in alinement with, the troughs to convey articles moved off the guideways into the troughs along the troughs, and means located at the exit end of each of the guideways for up-edging articles as they are fed off the guideways.

3. In an improved pushing and up-edging apparatus, the combination of a plurality of parallelly arranged guideways, each succeeding guideway being of greater length than the preceding one, a trough or guideway located at the exit end of such parallelly arranged guideways, a movable bottom for said trough, means for pushing material in the guideways onto said movable bottom, the different length of guideways providing for a plurality of parallelly arranged rows of material as said material is pushed off the guideways.

4. In an improved pushing and up-edging apparatus, the combination of a plurality of parallelly arranged guideways, each succeeding guideway being of greater length than the preceding one, a trough or guideway located at the exit end of such parallelly arranged guideways, a movable bottom for said trough, a curved plate at the exit end of each of the parallelly arranged guideways located between the guideways and the movable bottom and acting as an up-edging device, means for pushing material in the guideways onto said movable bottom, the different length of guideways providing for a plurality of parallelly arranged rows of material as said material is pushed off the guideways.

In testimony whereof, we have signed our names to this specification.

RAYMOND C. PENFIELD.
CLAUD E. FULLER.